US011511385B2

(12) United States Patent
Piraube et al.

(10) Patent No.: US 11,511,385 B2
(45) Date of Patent: Nov. 29, 2022

(54) METHOD OF PREPARING AN OPERATION OF SURFACING OF A LENS BLANK

(71) Applicant: Essilor International, Charenton-le-Pont (FR)

(72) Inventors: Sébastien Piraube, Dallas, TX (US); Xavier Bultez, Charenton-le-Pont (FR); Jérome Moine, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 1085 days.

(21) Appl. No.: 16/157,681

(22) Filed: Oct. 11, 2018

(65) Prior Publication Data
US 2019/0111538 A1    Apr. 18, 2019

(30) Foreign Application Priority Data
Oct. 13, 2017   (EP) ..................... 17306389

(51) Int. Cl.
*B24B 13/00*  (2006.01)
*B24B 9/14*  (2006.01)
(Continued)

(52) U.S. Cl.
CPC .......... *B24B 13/0018* (2013.01); *B24B 9/148* (2013.01); *B24B 13/0055* (2013.01); *G02C 7/02* (2013.01)

(58) Field of Classification Search
None
See application file for complete search history.

(56) References Cited

U.S. PATENT DOCUMENTS

| 5,149,337 A | 9/1992 | Watanabe | |
|---|---|---|---|
| 2006/0189255 A1* | 8/2006 | Akiyama | ............... B24B 9/148 451/240 |

(Continued)

FOREIGN PATENT DOCUMENTS

| CN | 102083588 A | 6/2011 |
|---|---|---|
| CN | 104903049 A | 9/2015 |

(Continued)

OTHER PUBLICATIONS

European Search Report, EP 17 30 6389, dated May 3, 2018.

*Primary Examiner* — Mohammad Ali
*Assistant Examiner* — Kelvin Booker
(74) *Attorney, Agent, or Firm* — Nixon & Vanderhye

(57) ABSTRACT

Disclosed is a method of preparing an operation of surfacing of a lens blank to transform the lens blank into a generated lens having a predetermined prism corresponding to an inclination between a front surface and a back surface of the generated lens at least locally. The method includes: for a plurality of devices destined to interact with the lens blank during the operation of surfacing to manufacture the predetermined prism of the generated lens, attributing a priority order to each; based on the priority order, attributing to each device a prism portion which is zero or included in a respective range delimited by a respective minimum prism portion and a respective maximum prism portion, the prism portion representing contribution of the corresponding device to the prism of the generated lens, for further interaction of each device with the lens blank during the operation of surfacing.

18 Claims, 3 Drawing Sheets

(51) Int. Cl.
*G02C 7/02* (2006.01)
*B24B 13/005* (2006.01)

(56) References Cited

U.S. PATENT DOCUMENTS

| | | | |
|---|---|---|---|
| 2011/0067628 A1 | 3/2011 | Savoie et al. | |
| 2011/0157545 A1* | 6/2011 | Applegate | G02C 7/027 623/6.11 |
| 2011/0257930 A1* | 10/2011 | Gourraud | B24B 47/225 29/559 |
| 2014/0302749 A1* | 10/2014 | Samukawa | B24B 9/148 318/568.1 |
| 2015/0331256 A1 | 11/2015 | Baudart | |
| 2016/0031058 A1* | 2/2016 | Daimaru | B24B 9/148 451/5 |
| 2016/0059373 A1* | 3/2016 | Daimaru | G06V 10/44 382/141 |
| 2016/0114453 A1* | 4/2016 | Godot | B29D 11/00942 29/407.04 |
| 2017/0235295 A1* | 8/2017 | Bultez | G02C 7/02 700/157 |
| 2017/0242268 A1 | 8/2017 | Baudart et al. | |
| 2017/0304984 A1 | 10/2017 | Savoie et al. | |

FOREIGN PATENT DOCUMENTS

| | | |
|---|---|---|
| CN | 105263672 A | 1/2016 |
| CN | 106716232 A | 5/2017 |
| CN | 106794567 A | 5/2017 |
| EP | 2 979 814 | 2/2016 |

\* cited by examiner

METHOD OF PREPARING AN OPERATION OF SURFACING OF A LENS BLANK

The invention relates to the field of industrial surfacing processes to manufacture ophthalmic lenses.

The invention relates more particularly to a method of preparing an operation of surfacing of a lens blank.

In general, a spectacle lens is specifically manufactured according to every wearer's needs which may take the form of specifications defined in a prescription established by an ophthalmologist.

Often, for instance when a wearer presents ocular convergence abnormalities, the prescription includes a value of prism, which characterizes the potency of the considered lens with regards to a desired displacement of the image through the lens so as to correct this problem. This prism information is typically associated in the prescription to another parameter known as the base.

For the manufacturing of a lens, a lens blank is submitted to various steps to form the desired lens, in particular one of surfacing during which the shape of the lens blank is modified to convey to the resulting shape desired optical properties. In practice, such as an operation is often carried out on a semi-finished lens blank whose front surface has previously been treated, the operation of surfacing essentially impacting the back surface in accordance with the prescription. Another one of these steps which is carried out prior to the surfacing step is a blocking step in which the semi-finished lens blank is attached to an insert via a support piece, this being done by filling a cavity closed by the lens blank and which includes the insert. Following steps includes a polishing step and an engraving step.

Different devices and tools may be used during some of these steps to impart prism to the lens blank, in particular during the operations of blocking and surfacing. For instance, prism can be imparted directly using a generator equipment which is used to grind the back surface of the semi-finished lens blank during the surfacing. Moreover, a prismatic blocker may be used during the blocking step to tilt the lens blank relative to the insert so that the semi-finished lens blank is tilted relatively to the turning axis of the generator equipment.

Other techniques are known to impart prism to a lens.

Yet, all share a similar problem in that they are heavily constrained in terms of how much prism they can impart to the considered lens.

The invention seeks to improve this situation.

The present invention advantageously provides a method of preparing an operation of surfacing of a lens blank to transform the lens blank into a generated lens, the generated lens having a predetermined prism corresponding to an inclination between a front surface and a back surface of the generated lens at least locally. The method is implemented using a processing module and comprising:

for a plurality of devices destined to interact with the lens blank during the operation of surfacing to manufacture the predetermined prism of the generated lens, attributing a priority order to each device of the plurality of devices, based on the priority order, attributing to each of the plurality of devices a prism portion which is zero or is comprised in a respective range delimited by a respective minimum prism portion and a respective maximum prism portion. The prism portion is representative of the contribution of the corresponding device to the prism of the generated lens, for further interaction of each device with the lens blank during the operation of surfacing to obtain, based on the prism portions, the generated lens having finally the predetermined prism.

According to a feature, the plurality of devices comprises at least a first device, a second device and a third device.

According to another feature, the first device is a generator equipment adapted to shape the lens blank during the operation of surfacing, the second device is a prismatic blocker configured to block an insert to which the lens blank is configured to be fastened during the operation surfacing so that the lens blank is tilted relative to a main axis of the insert, and the third device is a blocking ring configured to define a geometric configuration of a support material configured to fasten the lens blank to the insert and to tilt the lens blank with a given tilt angle and a variable tilt orientation.

According to another feature, the minimum prism portion of the first device is negative.

According to another feature, the method further comprises:

based on the priority order, selecting a primary device among the first and second devices and, testing whether the predetermined prism of the generated lens is comprised in the range of the primary device.

According to another feature, the method further comprises, when the predetermined prism is comprised in the range of the primary device, defining the prism portion of the primary device as corresponding to the predetermined prism.

According to another feature, the method further comprises, when the predetermined prism is outside the range of the primary device, selecting a secondary device among the plurality of devices other than the primary device based on the priority order.

According to another feature, when the primary device is the first device and the secondary device is the third device, the method further comprises determining at least one prism portion attributable to the third device which is greater than or equal to the difference between the predetermined prism and the maximum prism portion attributable to the primary device, and lower than or equal to the difference between the predetermined prism and the minimum prism portion of the primary device, and selecting the prism portion of the third device among the at least one prism portion attributable to the third device.

According to another feature, wherein, when the primary device is the second device and the secondary device is the third device, the method further comprises determining at least one prism portion attributable to the third device which is greater than or equal to the difference between the predetermined prism and the maximum prism portion attributable to the primary device, and lower than or equal to the predetermined prism, and selecting the prism portion of the third device among the at least one prism portion attributable to the third device.

According to another feature, wherein, when the secondary device is the first or second device, the method further comprises determining whether a condition is verified, the condition being defined by whether a combination of the first and second devices is sufficient to provide the predetermined prism.

According to another feature, wherein, when the condition is not verified, determining at least one prism portion attributable to the third device comprised between the difference between the predetermined prism and the sum of the maximum prism portions of the primary and secondary devices, and the difference between the predetermined prism and the minimum prism portion of the first device, and selecting the prism portion of the third device among the at least one prism portion attributable to the third device.

According to another feature, wherein the prism portions respectively attributed to the primary device and the device other than the primary and secondary devices are determined based on a remaining prism defined as the difference between the predetermined prism and the chosen prism portion of the third device.

According to another feature, wherein the prism portions respectively attributed to the primary device and the secondary device are determined based on a remaining prism defined as the difference between the predetermined prism and the chosen prism portion ($P_3$) of the third device.

According to another feature, wherein, when the condition is verified, the prism portion ($P_3$) of the third device is chosen as equal to zero, and the prism portions of the primary and secondary devices are chosen so as to provide the predetermined prism in combination.

According to another feature, wherein the prism portions respectively attributed to each device of the plurality of devices are determined such that the prism portion attributed to the device with the lowest priority order is maximized, and the prism portion attributed to device with highest priority order is minimized.

The invention also relates to a computer program comprising instructions destined to be executed by a processor for the implementation of the method as defined above.

The invention further relates to an apparatus of preparing an operation of surfacing of a lens blank to transform the lens blank into a generated lens, the generated lens having a predetermined prism corresponding to an inclination between a front surface and a back surface of the generated lens at least locally, the apparatus comprising a processing module configured to:
 for a plurality of devices destined to interact with the lens blank during the operation of surfacing to define the predetermined prism of the generated lens, attribute a priority order (PO) to each device of the plurality of devices,
 based on the priority order, attribute to each of the plurality of devices a prism portion which comprised in a respective range delimited by a respective minimum prism portion and a respective maximum prism portion, the prism portion being representative of the contribution of the corresponding device to the prism of the generated lens, for further interaction of each device with the lens blank during the operation of surfacing to obtain, based on the prism portions, the generated lens having the predetermined prism.

Other features and advantages of the invention will become apparent from the following description provided for indicative and non-limiting purposes, with reference to the accompanying drawings, wherein:

FIG. 1 illustrates a generated lens LEN.

As indicated above, the context of the invention is that of the manufacture of ophthalmic lenses, which are for instance destined to be coupled to a frame to form spectacles which advantageously have sight-correction properties.

In this context, the generated lens LEN is the result of an operation of surfacing of the manufacturing process, this operation being advantageously carried out on a semi-finished lens blank, hereinafter referred to as lens blank BLA.

The lens blank BLA comprises a front surface and a back surface. To minimize delays in the delivery of the generated lens LEN, one of the front and back surfaces is already finished before the operation of surfacing (hence the term "semi-finished"). In general, the front surface is the finished surface and the back surface is treated to respect the prescription. Alternatively, the back surface may be finished and the front surface is treated to respect the prescription.

The treatment of the unfinished surface of the lens blank includes the operation of surfacing.

In a general sense, the operation of surfacing can be seen as including the blocking step, during which the lens blank BLA is fastened to an insert as detailed below, and the surfacing of the lens blank BLA per se after the lens blank has been attached to the insert.

In a known manner, the operation of surfacing particularly includes imparting what is known as prism to the generated lens LEN.

Figure 1:
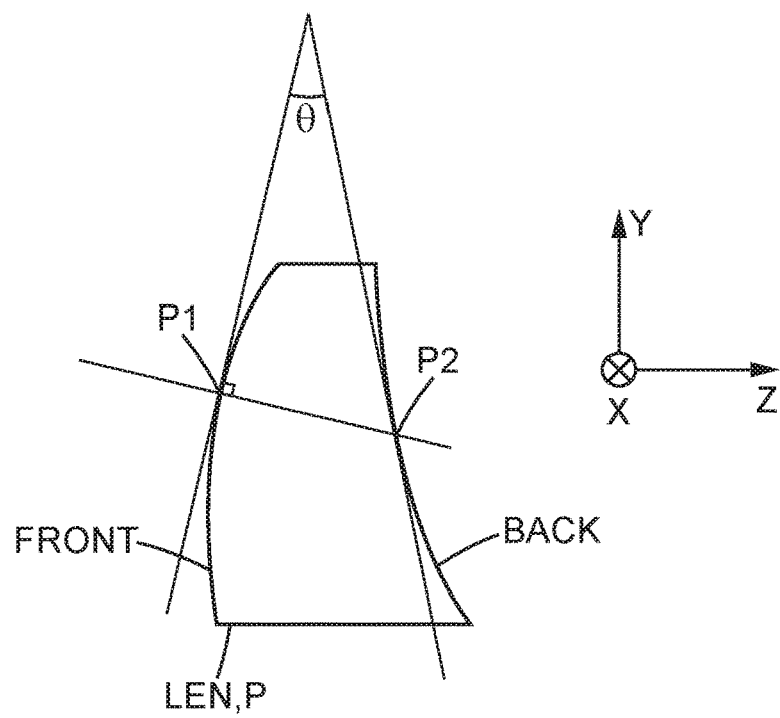
FIG. 1 illustrates a generated lens and the prism at a point of a lens.

FIG. 1 illustrates the generated lens LEN. The generated lens LEN comprises a finished front surface FRONT and a finished back surface BACK. The term "finished" shall mean here both front and back surfaces FRONT, BACK result from the operation of surfacing of the lens blank BLA. For instance, the finished back surface BACK results from the treatment of the front surface of the lens blank BLA. The finished front surface FRONT is for instance the same surface as the front surface of the lens blank BLA if the lens blank BLA is a semi-finished lens whose front surface has already been treated.

The generated lens LEN can be defined by the respective geometric shape of the front and back surfaces FRONT, BACK and by a set of data describing the positioning of one surface with respect to the other. The data are for example the thickness and the prism at a reference point of the front surface FRONT. The thickness at the reference point defines the distance along the axis Z between the front surface FRONT and the back surface BACK from the reference point. Prism at the reference point defined the rotation of one surface with respect to the other around the axis X and/or the axis Y. The full geometry of the generated lens LEN is defined by the above information.

More particularly and as illustrated in FIG. 1, to determine prism at any point $P_1$ of the front surface FRONT, one takes the direction normal to the front surface FRONT at the chosen point $P_1$. The chosen point $P_1$ is for instance the reference point. The straight line following the direction is secant to the back surface BACK at a point $P_2$. Prism at the point $P_1$ is defined by an angle $\theta$. The angle $\theta$ in question is defined as the angle between a plane which is tangential relative to the front surface FRONT at the point $P_1$ and a plane which is tangential relative to the back surface BACK at the point $P_2$. Prism characterizes, for each of a plurality of points onto the surface of the lens, the potency of the lens in the region of the considered point with regards to a desired displacement of an image-object through the lens.

Typically, the prism which is to be imparted to the generated lens LEN is defined in the prescription by an ophthalmologist, for instance through a value of the prism at the reference point of the generated lens LEN, for instance a reference point of the generated lens which corresponds to a reference point of the lens blank used during the operation of surfacing.

Figure 2:
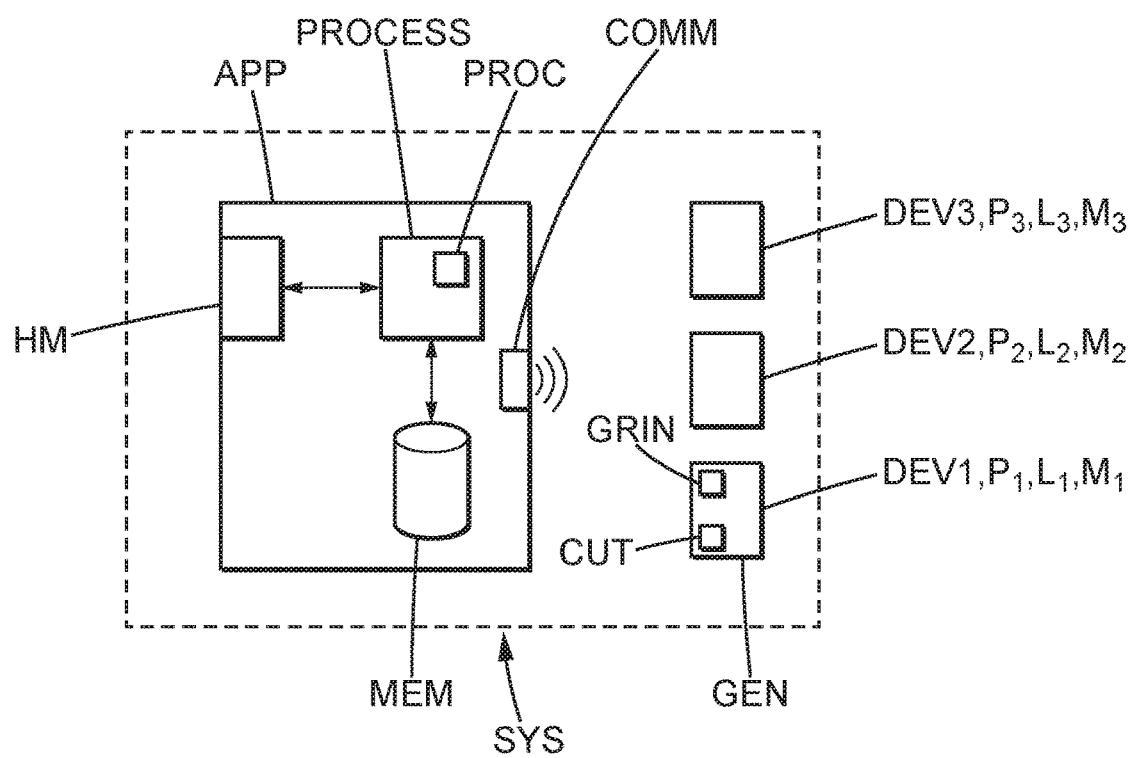
FIG. 2 illustrates a system according to the invention.

In reference to FIG. 2, the system SYS comprises a plurality of devices configured to be used during the operation of surfacing to transform the lens blank BLA into the generated lens LEN and an apparatus APP according to the invention.

Each of the devices is configured to be used during one or more step of the operation of surfacing, such as the step of blocking and/or of the surfacing of the lens blank BLA per se.

In the context of the invention, each of the devices is also configured to contribute to the prism of the generated lens LEN by imparting a respective prism portion to the lens blank BLA during the operation of surfacing. More precisely, each of the devices is configured to contribute to a predetermined prism P that the generated lens is destined to present.

For instance, the predetermined prism P corresponds to the prism of the generated lens at the reference point mentioned above.

Advantageously, the predetermined prism P is specified in a prescription which is used as an input for the manufacture of the lens which is to be obtained from the lens blank and the generated lens thereafter.

Jointly, the respective contributions of the devices form the prism of the generated lens LEN.

For instance, the plurality of devices comprises at least a first device DEV1, a second device DEV2 and a third device DEV3. These devices have respective contributions referred to as first, second and third prism portions $P_1$, $P_2$, $P_3$ respectively. As detailed below, the determination of these portions is a central goal of the method according to the invention detailed below.

The first device DEV1 is configured to impart the first prism portion $P_1$ to the lens blank BLA.

Advantageously, the first prism portion $P_1$ imparted by the first device DEV1 has a value comprised between a minimum prism portion $L_1$ and a maximum prism portion $M_1$. Advantageously, the minimum prism portion $L_1$ is negative. The minimum prism portion can thus be written as $-L_1'$, where $L_1'$ is positive. For example, $L_1'$ is equal to $M_1$.

In the context of the invention, the first device DEV1 is for example a generator equipment GEN, hereinafter generator GEN. The generator is configured to shape the lens blank BLA into the generated lens LEN during the operation of surfacing.

The configuration of the generator GEN is for instance known per se.

For example and in reference to FIG. 2, the generator includes a grinding module GRIN and/or a cutting module CUT which each configured to remove some of the matter of the lens blank BLA to shape the lens blank BLA into the generated lens LEN.

For instance, the generator GEN includes a cavity for fixing the lens blank BLA relative to a body of the generator and relative to which one or more piece of equipment of the grinding module GRIN and/or the cutting module CUT is movable.

A cavity is arranged in the body of the generator GEN. The cavity is disposed and designed to maintain the lens blank BLA for the operation of surfacing.

In particular, the grinding module GRIN and/or the cutting module CUT are adapted to process the lens blank BLA during the operation of surfacing to impart the first prism portion $P_1$ to the lens blank BLA.

Figure 3:
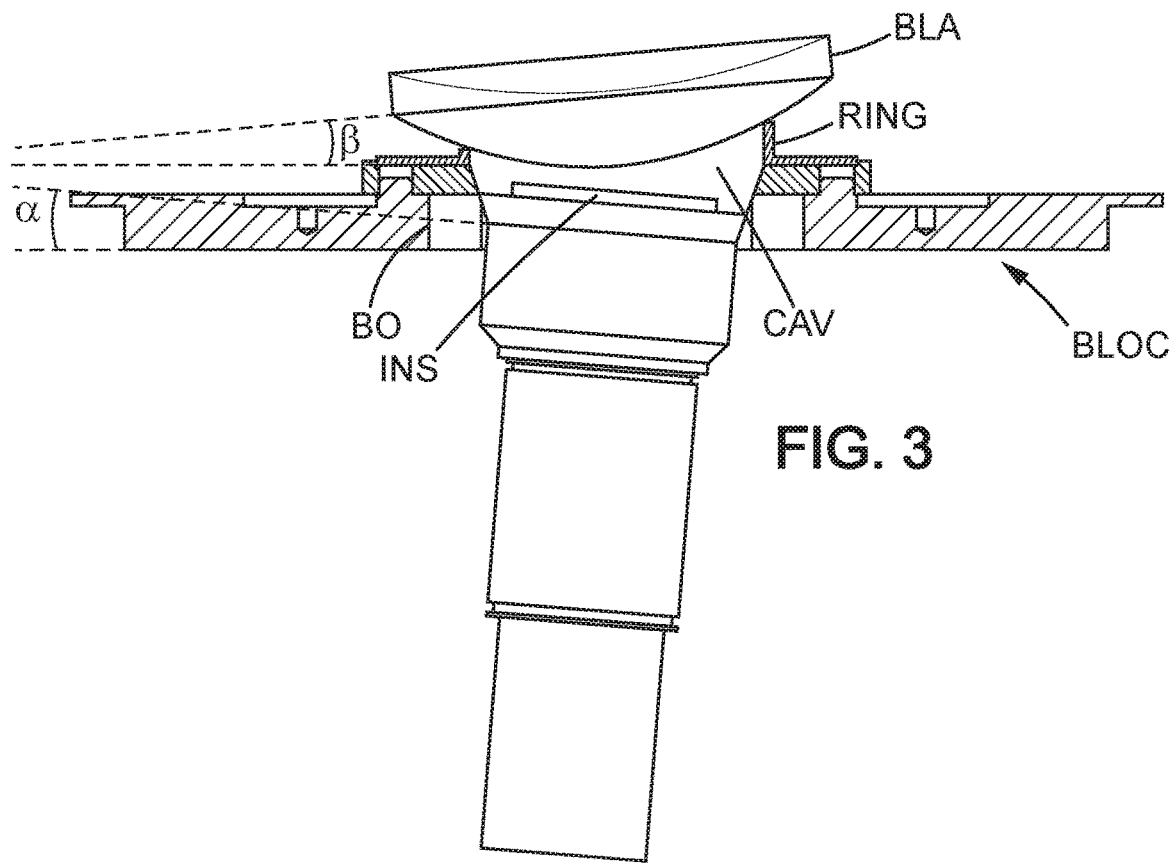
FIG. 3 illustrates a prismatic blocker and a blocking ring.

In reference to FIG. 3, the second device DEV2 is configured to impart a second prism portion $P_2$ to the lens blank BLA.

Advantageously, the second prism portion $P_2$ imparted by the second device has a value comprised between a minimum prism portion $L_2$ and a maximum prism portion $M_2$. For example, $L_2$ is taken equal to zero.

In the context of the invention, the second device is for example a prismatic blocker BLOC, hereinafter a blocker BLOC.

The blocker is configured to block an insert INS to which the lens blank BLA is configured to be fastened during the operation of surfacing so that the lens blank BLA is tilted relative to a main axis of the insert INS around which the lens blank BLA is destined to rotate during the operation of surfacing.

Still in reference to the FIG. 3, the third device DEV3 is configured to impart a third prism portion $P_3$ to the lens blank BLA.

Advantageously, the third prism portion $P_3$ imparted by the third device has a value comprised between a minimum prism portion $L_3$ and a maximum prism portion $M_3$.

In the context of the invention, the third device is for example a blocking ring RING. The blocking ring RING is configured to define internally the support material via which the lens blank BLA is fastened to the insert INS. In particular, it is adapted to define the geometric configuration of this support so that the lens blank BLA is tiled with a given tilt angle β and a variable tilt orientation. The orientation of the angle β is aligned on the prism orientation required by the lens blank BLA at a blocking location.

The blocking ring RING is configured to impart only a single value of prism to the lens blank BLA. In other words, $L_3$ is equal to $M_3$.

Advantageously, a plurality of third devices DEV3 is available. Each third device DEV3 of the plurality is defined at least by the single value of prism $L_3=M_3$ it is configured to impart to the lens blank BLA.

In practice, these various third devices DEV3 can be seen as a single device having a given prism portion which is variable (in a discrete manner for instance) between a minimum prism portion $L_3$ which corresponds to the prism portion of a smallest blocking ring available, and a maximum prism portion $M_3$ which corresponds to the prism portion of a biggest blocking ring available.

As illustrated on FIG. 3, the blocker BLOC comprises a body BO.

A cavity CAV is arranged in the body BO of the blocker BLOC. The cavity CAV enables to provide the insert INS to which the lens blank BLA is fastened via an adhesive layer. The cavity CAV is tilted with an angle α which causes prism to the lens blank BLA. Furthermore, the lens blank BLA may be provided with the blocking ring RING whose the geometric configuration causes prism to the lens blank BLA.

Regarding the apparatus APP, the latter is configured to prepare the operation of surfacing of the lens blank BLA to transform the lens blank BLA into a generated lens LEN. In particular, it is configured to determine the respective prism portions of each device so that the generated lens LEN exhibits the predetermined prism P.

Regarding the apparatus APP, as illustrated in FIG. 2, it comprises a human-machine interface HM, a communication module COMM, a memory MEM and a processing module PROCESS.

The human-machine interface HM is adapted for an operator to interact with the apparatus APP, in particular for inputting data which specify the operation of surfacing.

Advantageously, the input data also comprise others specifications of the prescription, like base, prism compensation (representative of a manufacturing deviation and a blocking error), data representative of a decentration and a thinning of the generated lens LEN and data representative of the position of the lens blank BLA with respect to the blocking ring RING during the blocking step. The input data enable to calculate the predetermined prism P to be provided to the lens blank BLA.

Alternatively or in parallel, the data comprise configuration data, which include the minimum and the maximum prism portions which can be imparted by each device to the lens blank BLA.

Advantageously, the human-machine interface HM includes a display.

The display is adapted for displaying information, such as that which pertain to the surfacing of the lens blank. For instance, among others, it is adapted to display the respective prism portions of the devices.

The communication module COMM is configured to allow the apparatus APP to communicate with other devices. For instance, it is adapted to allow the apparatus APP to communicate with the first, the second and the third devices DEV1, DEV2, DEV3.

For instance, the module in question is adapted to transmit a signal representative of the corresponding prism portion to impart for each device of the plurality of devices. In other words, the communication module is adapted to output the value of the respective prism portions.

In a general manner, any cable and/or non-cable communication technology may be supported by the communication module.

The memory MEM is adapted to store various programs which may be required for the apparatus APP to operate. In particular, in the context of the invention, the memory MEM is configured to store a computer program which includes instructions whose execution by a processor PROC, such as one comprised by the processing module PROCESS, causes the method according to the invention described below to be implemented.

The method is detailed hereinafter in reference to FIG. 4.

Figure 4:
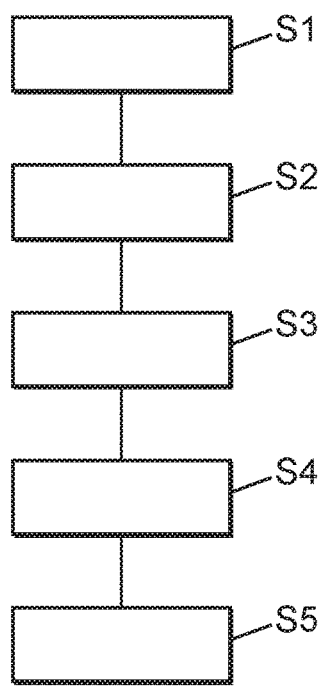
FIG. 4 illustrates schematically the method of preparing an operation of surfacing of a lens blank according to the invention, and FIG. 5 schematically represents the method of preparing an operation of surfacing of a lens blank according to an aspect of the invention.

FIG. 4 schematically illustrates the method of preparing the operation of surfacing of the lens blank BLA according to the invention.

In a first step S1, the predetermined prism P indicated on the prescription is provided to the apparatus APP. The predetermined prism P is for example inputted via the human-machine interface HM. Alternatively, it is provided using the communication module COMM.

In a second step S2, a priority order PO is attributed to each device of the plurality of devices. The priority order PO is for example an integer comprised between 1 and N, where N is the number of devices of the plurality of devices.

For instance, the lower the priority order PO of a device, the higher the priority the device has. Alternatively, the higher the priority order PO of a device, the higher the priority the device has.

The priority order attributed to each device of the plurality of devices is for instance based on local equipment technical performances. For example, if the available generator has low quality results when imparting prism to the lens blank BLA, the priority order PO attributed to the generator is the last priority. In another example, if the available blocking rings are technically difficult to use, the priority order PO attributed to the blocking rings is the last priority.

In a given embodiment, the priority order of the devices forms part of the configuration data.

In a third step S3, which forms a core step in the sense of the invention, the respective values of the prism portions are determined for each device of the plurality of devices based the priority order PO which has been defined in step S2.

As indicated above, the prism portion of each device is representative of the contribution of the corresponding device to the prism, i.e. the overall prism, of the generated lens LEN. The combination of each prism portion imparted by each device amounts to the predetermined prism P which has been previously provided to the apparatus APP.

The details of the third step S3 of the method will be described hereinafter in reference to FIG. 5 in the configuration disclosed above in which the plurality of devices comprises three devices, which are, in order, the generator GEN, the blocker BLOC and the blocking ring RING. As explained above, there are in practice various blocking rings, each one being able to impart a single value of prism portion. Thereafter, the plurality of available blocking rings are seen as a single DEV3 and thus as a single blocking ring RING having a given prism portion which is variable (typically in a discrete manner) between the minimum prism portion $L_3$ which corresponds to the prism portion of a smallest blocking ring available, and the maximum prism portion $M_3$ which corresponds to the prism portion of a biggest blocking ring available.

The priority order PO of each device is an integer comprised between 1 and 3. 1 corresponds to the highest priority and 3 corresponds to the lowest priority.

In a fourth step S4, the results of step S3 are outputted by the apparatus for the purpose of surfacing the lens blank BLA to transform the lens blank BLA in the generated lens LEN. In particular, the prism portions are thus outputted.

The results of the method are for example displayed on the human-machine interface HM and are thus made available to the operator. Alternatively or in parallel, the results are transmitted to a further device configured to control at least one device of the plurality of devices for the operation of surfacing of the lens blank BLA.

In a fifth step S5, the operation of surfacing is carried out on the lens blank BLA to transform the lens blank BLA in the generated lens LEN according to the obtained results, in particular the prism portions. The generated lens LEN obtained after surfacing complies with the prescription, in particular regarding the predetermined prism.

Figure 5:
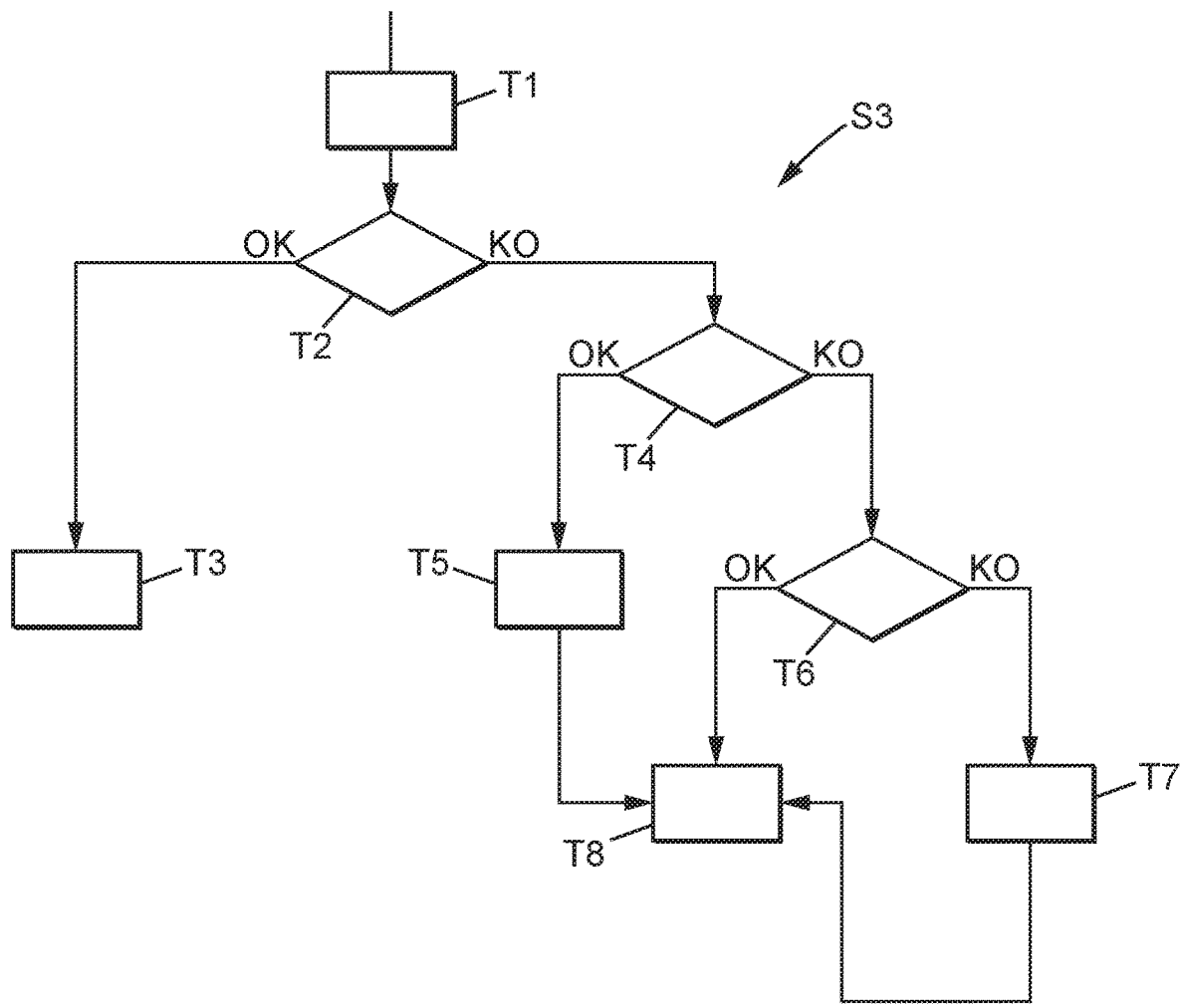

As for the details of step S3, FIG. 5 schematically illustrates the method of preparing the operation of surfacing of the lens blank BLA according to the invention.

In a first step T1, a primary device PRIM is selected among the generator GEN and the blocker BLOC based on the priority order PO. For instance, if the priority order PO of the generator is 1 and the priority order PO of the blocker is 3, the primary device PRIM is the generator GEN. Conversely, if the priority order PO of the generator is 2 and the priority order PO of the blocker BLOC is 1, the primary device PRIM is the blocker BLOC.

In a second step T2, a test is carried out to determine if the predetermined prism P is comprised in the range of the primary device PRIM. In other words, the test in question includes determining if the predetermined prism P is comprised in the range $[-L_1'; M1]$ if the primary device PRIM is the generator GEN. Alternatively, the test in question includes determining if the predetermined prism P is comprised in the range $[L_2; M_2]$ if the primary device PRIM is the blocker BLOC.

In a third step T3 if the predetermined prism P is comprised in the range of the primary device (OK in FIG. 5), the prism portion to be imparted by the primary device to the lens blank BLA is defined as corresponding to the predetermined prism P. For instance, if the primary device PRIM is the generator GEN, the first prism portion $P_1$ is equal to P. Conversely, if the primary device PRIM is the blocker BLOC, the second prism portion $P_2$ is equal to P. In such a case, the primary device is thus sufficient to impart the predetermined prism P to the lens blank BLA. There is therefore no need to use the two remaining devices.

Conversely, in a fourth step T4, if the predetermined prism P is outside the range of the primary device PRIM (KO in FIG. 5), a secondary device SEC is selected among the remaining devices. In other words, the secondary device SEC is selected among the plurality of devices other than the primary device PRIM.

The selection of the secondary device SEC is based on the priority order PO of the remaining devices. For instance, if the primary device PRIM is the generator GEN, the secondary device SEC is thus the blocker BLOC or the blocking ring RING according to the priority order PO of each one. Conversely, if the primary device PRIM is the blocker BLOC, the secondary device SEC is thus the generator GEN or the blocking ring RING according to the priority order PO of each one. More precisely, the step T4 includes testing if the priority order PO of the blocking ring RING is lower than the priority order PO of the device among the generator GEN and the blocker BLOC that is not the primary device PRIM.

In a fifth step T5 if the secondary device SEC is the blocking ring RING (OK in FIG. 5), there are two possibilities according to which of the primary and secondary devices PRIM, SEC has the lowest priority order PO.

If the priority order of the secondary device SEC is lower than the priority order PO of the primary device PRIM i.e. if the priority order PO of the blocking ring RING is lower than the priority order PO of the primary device, the third prism portion $P_3$ chosen is the closest to the predetermined prism P. For instance, if the predetermined prism P is higher than the maximum prism portion $M_3$, the third prism portion $P_3$ is equal to $M_3$. Alternatively, if the predetermined prism portion is comprised between the minimum prism portion $L_3$ and the maximum prism portion $M_3$, the third prism portion $P_3$ is equal to the predetermined prism P if P is one of the possible values which could be provided. In other words, if one of the plurality of blocking rings is configured to impart the predetermined prism P to the lens blank BLA, this blocking ring RING is chosen. Otherwise, the closest blocking ring RING of the plurality of blocking rings is chosen.

Conversely, if the priority order PO of the primary device PRIM is lower than the priority order PO of the secondary device SEC i.e. if the priority order PO of the primary device PRIM is lower than the priority order PO of the blocking ring, the third prism portion $P_3$ chosen is chosen so as to cover the amount of prism exceeding the maximum prism portion that the primary device PRIM can impart to the lens blank BLA. Such a choice allows maximizing the prism portion imparted by the primary device PRIM. This choice also allows minimizing the prism portion imparted by the device which is neither the primary device PRIM nor the secondary device SEC. For instance, if the primary device PRIM is the blocker BLOC and if the combination of the blocker BLOC and the blocking ring RING is sufficient to impart the predetermined prism P to the lens blank BLA, the third pism portion $P_3$ chosen is defined as $P_3=P-M_2$. Alternatively, if the combination of the blocker BLOC and the blocking ring RING is not sufficient to impart the predetermined prism P to the lens blank BLA, the third prism portion $P_3$ is chosen such as the second prism portion $P_2$ imparted by the blocker BLOC will be maximized i.e. $P_2=M_2$ and the third prism portion $P_3$ imparted by the generator GEN will be maximized with respect to the remaining prism portion to be imparted by the device which is neither the primary device PRIM nor the secondary device SEC.

Conversely, in a sixth step T6 if the secondary device SEC is not the blocking ring RING i.e. if the secondary device SEC is the generator GEN or the blocker BLOC (KO in FIG. 5), a test is carried out to verify a condition. This condition is defined by whether the predetermined prism P is greater than or equal to the minimum prism portion of the generator GEN and lower than or equal to the sum of the maximum prism portions of the generator GEN and the blocker BLOC. In other words, this condition enables to verify if the blocking ring RING is necessary or if a combination of the generator GEN and the blocker BLOC is sufficient to impart the predetermined prism P to the lens blank BLA. As explained above, the contribution of a device to the prism can be zero. It is thus understood here that a combination of the generator GEN and the blocker BLOC can be only one of the two devices in question.

If a combination of the generator GEN and the blocker BLOC is sufficient, the condition is considered as verified (OK in FIG. 5). Conversely, if the blocking ring RING is necessary, the condition is considered as non-verified (KO in FIG. 5).

A seventh step T7 is achieved if the blocking ring RING is necessary, the condition of the step T6 being considered as non-verified (KO in FIG. 5). The step T7 is the same as the step T5 explained above, the priority order PO of the blocking ring RING being higher than the priority order PO of the secondary device SEC and thus higher than the priority order PO of the primary device PRIM. The third prism portion $P_3$ is thus determined such as the third prism portion $P_3$ imparted by the blocking ring RING is minimized. It is understood here that "minimized" here means that the third prism portion $P_3$ imparted by the blocking ring RING allows the combination of the generator GEN and the blocker BLOC to impart the remaining prism $P-P_3$, while being as low as possible.

In an eighth step T8, there are three possibilities according to the previous step.

If the previous step is the step T6 i.e. if the secondary device SEC is the generator GEN or the blocker BLOC, and the blocking ring RING is not necessary to impart the predetermined prism P to the lens blank BLA (OK in FIG. 5), it means that t the combination of the generator GEN and the blocker BLOC is sufficient to impart the predetermined prism P to the lens blank BLA.

If the primary device PRIM is the generator GEN, the test carried out at the step T2 shows that the generator GEN alone is not sufficient to impart the predetermined prism P to the lens blank since the predetermined prism is not comprised in the range $[-L_1'; M_1]$. In other words, P is lower than $-L_1'$ or P is greater than $M_1$. A case where the predetermined prism P is lower than $-L_1'$ corresponds to an impossible case. In other words, none of the devices here can impart the predetermined prism P to the lens blank BLA. In addition, the test carried out at the step T6 shows that the combination of the generator GEN and the blocker BLOC is sufficient to impart the predetermined prism P to the lens blank BLA. However the generator GEN alone is not sufficient according to the test of the step T2. Consequently, the combination of the generator GEN and the blocker BLOC is necessary to impart the predetermined prism to the lens blank BLA. The contribution of the primary device PRIM, here the generator GEN, is maximized compared to the contribution of the secondary device SEC, here the blocker BLOC. For instance, the predetermined prism P can be imparted by $P=P_1+P_2$ where $P_1=M_1$ and $P_2=P-M_1$.

If the primary device PRIM is the blocker BLOC, the test carried out at the step T2 shows that the blocker BLOC alone is not sufficient to impart the predetermined prism P to the lens blank since the predetermined prism is not comprised in the range $[L_2; M_2]$. In other words, P is lower than $L_2$ or P is greater than $M_2$. In addition, the test carried out at the step T6 shows that the combination of the generator GEN and the blocker BLOC is sufficient to impart the predetermined prism P to the lens blank BLA. If the predetermined prism P is greater than the maximum prism portion $M_2$, it means that the combination of the generator GEN and the blocker BLOC is necessary to impart the predetermined prism to the lens blank BLA. The contribution of the primary device PRIM, here the blocker BLOC, is maximized compared to the contribution of the secondary device SEC, here the generator GEN. For instance, the predetermined prism P can be imparted by $P=P_1+P_2$ where $P_1=P-M_2$ and $P_2=M_2$. If the predetermined prism P is lower than the minimum prism portion $L_2$, and considering that the primary device PRIM is the blocker BLOC, the latter can impart a non-zero contribution, the predetermined prism P can be imparted for instance by $P=P_1+P_2$ where $P_2=L_2$ and $P_1=P-L_2$.

If the previous step is the step T5 i.e. if the secondary device SEC is the blocking ring RING, the step T8 is similar to the case where the previous step is T6, the predetermined prism P being redefined as the difference between the predetermined prism P and the third prism portion $P_3$ determined in the step T5. It is understood here, that the remaining prism to impart to the lens blank BLA is redefined as $P-P_3$. Then, the prism portion imparted by the primary device PRIM is maximized, while the prism portion imparted by the device which is neither the primary device PRIM nor the secondary device SEC is minimized.

If the previous step is the step T7, the step T8 is similar to the case where the previous step is T6, the predetermined prism P being redefined as the difference between the predetermined prism P and the third prism portion $P_3$ determined in the step T7. It is understood here, that the remaining prism to impart to the lens blank BLA is redefined as $P-P_3$. Then, the prism portion imparted by the primary device PRIM is maximized, while the prism portion imparted by the secondary device SEC is minimized.

The invention has several advantages.

Firstly, the proposed method enables to optimize the utilization of each device in a laboratory and enables to save time.

In addition, the method improves the quality of the generated lens LEN obtained after the operation of surfacing by exploiting the capacity of the blocker and the blocking ring to impart prism to the lens blank BLA during the blocking step. The utilization of the generator is consequently optimized.

The invention claimed is:

1. A method of preparing an operation of surfacing of a lens blank (BLA) to transform the lens blank into a generated lens (LEN), the generated lens having a predetermined prism (P) corresponding to an inclination between a front surface (FRONT) and a back surface (BACK) of the generated lens at least locally, the method being implemented using a processing module (PROCESS) and comprising:
 for a plurality of devices destined to interact with the lens blank during the operation of surfacing to manufacture the predetermined prism of the generated lens, attributing a priority order (PO) to each device of said plurality of devices,
 based on said priority order, attributing to each of the plurality of devices a prism portion ($P_1$, $P_2$, $P_3$) which is zero or is comprised in a respective range delimited by a respective minimum prism portion ($L_1$, $L_2$, $L_3$) and a respective maximum prism portion ($M_1$, $M_2$, $M_3$), said prism portion being representative of the contribution of the corresponding device to the prism of the generated lens, for further interaction of each device with the lens blank during the operation of surfacing to obtain, based on the prism portions, the generated lens having finally said predetermined prism,
 wherein the prism portions respectively attributed to each device of the plurality of devices are determined such that the prism portion attributed to the device with the lowest priority order is maximized, and the prism portion attributed to device with highest priority order is minimized.

2. The method of claim 1, wherein the plurality of devices comprises at least a first device (DEV1), a second device (DEV2) and a third device (DEV3).

3. The method of claim 2, wherein the first device is a generator equipment (GEN) adapted to shape the lens blank during the operation of surfacing, the second device is a prismatic blocker (BLOC) configured to block an insert (INS) to which the lens blank is configured to be fastened during the operation surfacing so that the lens blank is tilted ($\alpha$) relative to a main axis of the insert, and the third device is a blocking ring (RING) configured to define a geometric configuration of a support material configured to fasten the lens blank to the insert and to tilt the lens blank with a given tilt angle ($\beta$) and a variable tilt orientation.

4. The method of claim 3, wherein the minimum prism portion of the first device is negative.

5. The method of claim 2, wherein the minimum prism portion of the first device is negative.

6. The method of claim 5, further comprising:
 based on the priority order, selecting a primary device (PRIM) among the first and second devices and,
 testing whether the predetermined prism of the generated lens is comprised in the range of the primary device.

7. The method of claim 6, further comprising, when the predetermined prism is comprised in the range of the primary device, defining the prism portion ($P_1$, $P_2$) of the primary device as corresponding to the predetermined prism.

8. The method of claim 6, further comprising, when the predetermined prism is outside the range of the primary device, selecting a secondary device (SEC) among the plurality of devices other than said primary device based on the priority order.

9. The method of claim 8, wherein, when the primary device is the first device and the secondary device is the third device, the method further comprises determining at least one prism portion attributable to the third device which is greater than or equal to the difference between the predetermined prism and the maximum prism portion ($M_1$) attributable to the primary device, and lower than or equal to the difference between the predetermined prism and the minimum prism portion ($L_1$) of the primary device, and selecting the prism portion ($P_3$) of the third device among the at least one prism portion attributable to the third device.

10. The method of claim 9, wherein the prism portions respectively attributed to the primary device and the device other than the primary and secondary devices are determined based on a remaining prism defined as the difference between the predetermined prism and the chosen prism portion ($P_3$) of the third device.

11. The method of claim 8, wherein, when the primary device is the second device and the secondary device is the third device, the method further comprises determining at least one prism portion attributable to the third device which is greater than or equal to the difference between the predetermined prism and the maximum prism portion ($M_2$) attributable to the primary device, and lower than or equal to the predetermined prism, and selecting the prism portion ($P_3$) of the third device among the at least one prism portion attributable to the third device.

12. The method of claim 11, wherein the prism portions respectively attributed to the primary device and the device other than the primary and secondary devices are determined based on a remaining prism defined as the difference between the predetermined prism and the chosen prism portion ($P_3$) of the third device.

13. The method of claim 8, wherein, when the secondary device is the first or second device, the method further comprises determining whether a condition is verified, said condition being defined by whether a combination of the first and second devices is sufficient to provide the predetermined prism.

14. The method of claim 13, wherein, when said condition is verified, the prism portion ($P_3$) of the third device is chosen as equal to zero, and the prism portions of the primary and secondary devices are chosen so as to provide the predetermined prism in combination.

15. The method of claim 13, wherein, when said condition is not verified, determining at least one prism portion attributable to the third device comprised between the difference between the predetermined prism and the sum of the maximum prism portions of the primary and secondary devices, and the difference between the predetermined prism and the minimum prism portion of the first device, and selecting the prism portion of the third device among the at least one prism portion attributable to the third device.

16. The method of claim 15, wherein the prism portions respectively attributed to the primary device and the secondary device are determined based on a remaining prism defined as the difference between the predetermined prism and the chosen prism portion ($P_3$) of the third device.

17. An apparatus (APP) of preparing an operation of surfacing of a lens blank (BLA) to transform the lens blank into a generated lens (GEN), the generated lens having a predetermined prism (P) corresponding to an inclination between a front surface and a back surface of the generated lens at least locally, the apparatus comprising a processing module (PROCESS) configured to:
for a plurality of devices destined to interact with the lens blank during the operation of surfacing to define the predetermined prism of the generated lens, attribute a priority order (PO) to each device of said plurality of devices,
based on said priority order, attribute to each of the plurality of devices a prism portion ($P_1$, $P_2$, $P_3$) which comprised in a respective range delimited by a respective minimum prism portion ($L_1$, $L_2$, $L_3$) and a respective maximum prism portion ($M_1$, $M_2$, $M_3$), said prism portion being representative of the contribution of the corresponding device to the prism of the generated lens, for further interaction of each device with the lens blank during the operation of surfacing to obtain, based on the prism portions, the generated lens having said predetermined prism,
wherein the prism portions respectively attributed to each device of the plurality of devices are determined such that the prism portion attributed to the device with the lowest priority order is maximized, and the prism portion attributed to device with highest priority order is minimized.

18. A non-transitory computer-readable medium on which is stored a computer program comprising instructions which, when executed by a processor (PROC), causes the processor to perform a method of preparing an operation of surfacing of a lens blank (BLA) to transform the lens blank into a generated lens (LEN), the generated lens having a predetermined prism (P) corresponding to an inclination between a front surface (FRONT) and a back surface (BACK) of the generated lens at least locally, the method being implemented using a processing module (PROCESS) and comprising:
for a plurality of devices destined to interact with the lens blank during the operation of surfacing to manufacture the predetermined prism of the generated lens, attributing a priority order (PO) to each device of said plurality of devices,
based on said priority order, attributing to each of the plurality of devices a prism portion ($P_1$, $P_2$, $P_3$) which is zero or is comprised in a respective range delimited by a respective minimum prism portion ($L_1$, $L_2$, $L_3$) and a respective maximum prism portion ($M_1$, $M_2$, $M_3$), said prism portion being representative of the contribution of the corresponding device to the prism of the generated lens, for further interaction of each device with the lens blank during the operation of surfacing to obtain, based on the prism portions, the generated lens having finally said predetermined prism,
wherein the prism portions respectively attributed to each device of the plurality of devices are determined such that the prism portion attributed to the device with the lowest priority order is maximized, and the prism portion attributed to device with highest priority order is minimized.

* * * * *